United States Patent [19]

Hansen

[11] 4,140,293
[45] Feb. 20, 1979

[54] NON-NAIL U-SHAPED CLAMP TYPE BARBED BRACKET FOR SUPPORTING ELECTRIC OUTLET BOX

[76] Inventor: Woodrow C. Hansen, Rte. 2, Box 2002, Grass Valley, Calif. 95945

[21] Appl. No.: 859,340

[22] Filed: Dec. 12, 1977

[51] Int. Cl.² ........................................... F16M 13/00
[52] U.S. Cl. .................................. 248/217.2; 174/58; 220/3.9; 248/DIG. 6
[58] Field of Search ............... 248/217.3, 217.2, 216.4, 248/216.1, 205 R, DIG. 6; 220/3.9, 3.92, 3.3; 174/58; 52/DIG. 6, 702

[56] References Cited

U.S. PATENT DOCUMENTS

| 3,020,602 | 2/1962 | Siering | 52/DIG. 6 |
| 3,097,821 | 7/1963 | Richards | 248/DIG. 6 X |
| 3,724,795 | 4/1973 | Callahan | 248/205 R X |

FOREIGN PATENT DOCUMENTS 965491 7/1964 United Kingdom ................ 52/DIG. 6

Primary Examiner—J. Franklin Foss
Attorney, Agent, or Firm—William R. Piper

[57] ABSTRACT

A non-nail U-shaped clamp type barbed bracket for connecting electric outlet box to a wall stud in which the U-shaped clamp is permanently secured to one side wall of the outlet box and the clamp can be hammered into place at a desired position on a wall stud. The two sides of the U-shaped clamp will frictionally grip the adjacent sides of the stud and each clamp side has inwardly extending barbs which will dig into the stud and prevent the removal of the clamp therefrom. In addition, the web portion of the clamp has an inwardly extending pointed prong that will enter the stud and prevent any vertical movement of the clamp and outlet box with respect to the stud.

1 Claim, 4 Drawing Figures

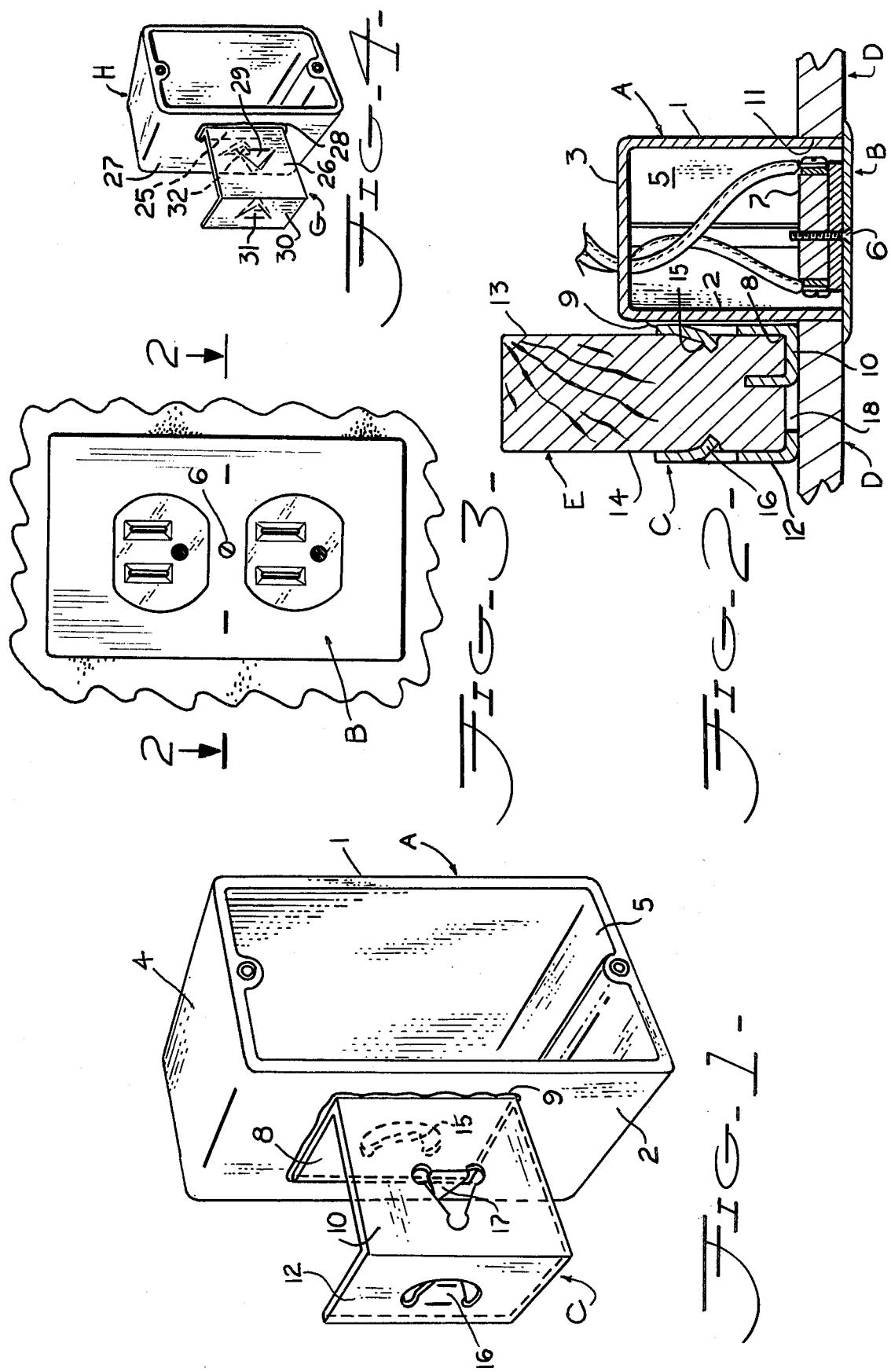

NON-NAIL U-SHAPED CLAMP TYPE BARBED BRACKET FOR SUPPORTING ELECTRIC OUTLET BOX

SUMMARY OF THE INVENTION

An object of my invention is to provide a U-shaped clamp that is permanently secured to one side of an electric outlet box so that the clamp side walls face in an opposite direction to the open end of the box. Moreover, the web portion of the U-shaped clamp is spaced away from the open front of the box a distance equal to the thickness of the wall board or other material which will be supported by the stud. This is for the purpose of permitting the front face of the wall board to lie substantially flush with the plane of the open front of the box when the wall board is secured to the stud.

A further object of my invention is to provide the side walls of the clamp with inwardly inclined barbs or grippers that will engage with the sides of the stud to which the clamp is attached and face in a direction to prevent the removal of the clamp from the stud. No nails are needed in securing the clamp to the stud because the clamp web portion has an inwardly extending pointed prong which will penetrate the stud when the clamp is hammered into place and the prong will prevent any vertical movement of the clamp with respect to the stud. The electric outlet box may also be square or hexagonal in shape and it may be secured to a cross member in the wall or to a ceiling joist.

BRIEF DESCRIPTION OF THE DRAWING

FIG. 1 is a perspective view of a standard electric outlet box and shows my clamp secured to one side of the box.

FIG. 2 is a horizontal section through the box and clamp and shows the clamp secured to a wall stud. The cover for the box is also shown and the adjacent ends of two wall board panels. FIG. 2 is taken along the line 2—2 of FIG. 3.

FIG. 3 is a front elevation of FIG. 2 and shows the face view of the cover for the electric outlet box.

FIG. 4 is a perspective view of a modified form of an electric outlet box in which a barb is struck out from one side wall of the box and an L-shaped clamp is permanently secured to the barbed side wall and has a web portion with a pointed prong therein and extending normal to the plane of the web. The L-shaped clamp has another side integral with the web portion and substantially paralleling the box barbed sidewall, this clamp side wall having a barb struck up out of it and facing in a direction to dig into the adjacent surface of a stud or the like to which the clamp and box have been secured and preventing their removal.

DESCRIPTION OF THE PREFERRED EMBODIMENTS

In carrying out my invention, I make use of a standard electric outlet box which may be made of metal or plastic and is indicated generally at A, in FIGS. 1 and 2. The outlet box A, has side walls 1 and 2, a rear wall 3, and top and bottom walls 4 and 5, respectively. The box has an open front and a cover plate B, is secured to the box A, by a screw 6, see FIG. 2, that enters a threaded bore in the electrical unit 7 within the box as shown in FIG. 1. The parts thus far described are standard and form no part of my invention except insofar as they cooperate with the parts now to be described.

Referring to FIGS. 1 and 2, it will be seen that I provide a U-shaped clamp C, preferably made of metal and I affix the side 8 of the clamp to the side wall 2 of the box A, by an epoxy layer 9, or other suitable permanent fastening means. If desired, the side 8 of the clamp C, could have a plurality of small openings, not shown, in which some of the epoxy would be received so as to make a firm permanent connection between the clamp and the box.

The side 8 of the clamp is positioned on the box side wall 2 so that the clamp web portion 10 is spaced the thickness of the wall board D, see FIG. 2, away from the box open front. The face of the web portion 10 of the clamp C, lies parallel to the plane of the open front of the box A. This permits the box cover B to extend over the adjacent edges of the rectangular cutout portion 11 of the wall board D that receives the box.

I provide novel and simple means for permitting the clamp C to be secured to a wall stud E, at any desired vertical position along the stud, see FIG. 2. The U-shaped clamp C, is shaped so that its sides 8 and 12 will yieldingly grip the adjacent sides 13 and 14 of the wall stud E. The clamp side 8 has a stamped out and inclined pointed barb 15 that faces forwardly in FIG. 2 and tends to dig into the side 13 of the stud. In like manner, the clamp wall 12 has a stamped out and inclined pointed barb 16 that also faces forwardly and tends to dig into the side 14 of the stud. These two inwardly inclined barbs 15 and 16 will permit the clamp C to be hammered into place on the wall stud E, but will prevent the removal of the clamp from the stud because the pointed ends of the barbs 15 and 16 will dig into the sides 13 and 14 of the stud and prevent this from happening. It is possible that only one inclined and pointed barb on either clamp wall 8 or 12 would function to prevent the clamp removal from the stud. The pointed ends of the barbs 15 and 16 may be bent inwardly at a slight angle for aiding the barbs in biting into the adjacent sides of the stud.

I provide novel means for preventing the clamp C from moving vertically along the stud after once the clamp is hammered into place and this same means permits the clamp to be fastened to the stud without the need for nails or screws. In both FIGS. 1 and 2, the clamp web portion 10 has an inwardly extending prong 17 or spike struck out from the web and extending substantially at right angles to the plane of the web. When the clamp C, is hammered into place on the stud E, the clamp sides 8 and 12 will yieldingly contact the adjacent sides of the stud and the prong 17 and will penetrate the front surface 18 of the stud and will take the place of a nail or other fastening means. When the clamp is hammered into place on the stud E, it will automatically position the electrical outlet box A so that the stud can receive the wall board D, and the open front of the box will lie flush with the front surface of the wall board. The connecting of the cover B to the box A will provide a finished appearance.

The clamp C, is simple in construction and yet performs several unique functions. As already stated, the prong 17 acts as the fastening means for securing the clamp to the stud E. This prong 17 prevents the clamp from moving vertically along the stud. Another feature is provided by the two inwardly inclined barbs 15 and 16 which will dig into the adjacent sides of the stud and prevent the removal of the clamp from the stud. The clamp correctly positions the box in relation to the thickness of the wall board D, so that when the wall board is secured to the stud the open front of the box will lie flush with the front surface of the wall board.

The electric outlet box A may be of any shape and it may be for a ceiling junction. The sides 8 and 12 of the U-shaped bracket C may have a plurality of grippers, not shown, on their inner surfaces rather than the barbs 15 and 16, and the inwardly inclined barbs may have their pointed ends bent inwardly at a slightly greater angle in order to dig into the wood surfaces of the supporting members. I have shown a vertically extending stud E, in the drawing although the bracket C may be secured to a cross piece or a ceiling joist, neither of which is shown. The clamp when attached to its supporting member will leave a smooth face surface on the web 10 because no nails are used. The web 10 could be slightly wider than the thickness of the joist E to accommodate for different stud thicknesses and the two sides 8 and 12 could be inclined toward each other at a slight angle so that these sides would yieldingly grip the adjacent sides of the stud.

In FIG. 4 I show a slightly modified form of bracket. In this form the bracket G, is L-shaped and has a flange 25 bent at right angles to the web portion 26 and permanently secured to a wall 27 of a standard electric outlet box H, either by spot welding 28 or other suitable fastening means. The web portion 26 has an inwardly extending struck up prong or spike 29 and the side 30 of the clamp has an inwardly inclined barb 31, struck out from the side with its pointed end facing toward the web portion 26.

The side wall 27 of the outlet box H, which is preferably made from metal has a barb 32 struck out from it and inclined inwardly to the clamp side 30 with its pointed end facing toward the web portion 26. The barb 32 takes the place of the barb 15 which is used in the bracket C of the preferred form shown in FIGS. 1 and 2.

The web portion 26 of the L-shaped clamp G, in FIG. 4, is spaced rearwardly from the open front of the electric outlet box H so as to leave sufficient space for the thickness of the wall board or wood panelling that might be used.

I claim:

1. A bracket permanently secured to a wall of an electric outlet box, the front edges of the box lying in the same flat plane;
   (a) said bracket having a web portion extending from the box wall with the plane of the web paralleling the flat plane of the box front edges and being spaced rearwardly therefrom a distance sufficient to accommodate the thickness of the wallboard associated with the box;
   (b) said web having a prong extending rearwardly therefrom and forming a right angle with the plane of the web so that when the bracket is hammered into place on a stud, the prong will enter the stud and prevent any vertical movement of the bracket and box;
   (c) said bracket having an intergral side wall extending rearwardly and substantially at right angles to the plane of the web so that when the bracket is hammered into place on the stud, the bracket side wall will contact the adjacent side of the stud; and
   (d) said bracket side wall having an inwardly inclined barb extending toward the web so that the barb will engage with the stud wall and prevent the removal of the bracket and box from the stud; and
   (e) whereby the bracket and box can be secured to a stud without the use of any nails and the prong and the barb will prevent a vertical or horizontal movement of the bracket and box with respect to the stud after once the bracket is hammered into place on the stud.

* * * * *